US012619663B1

(12) United States Patent
Boué et al.

(10) Patent No.: US 12,619,663 B1
(45) Date of Patent: May 5, 2026

(54) FOLLOW-UP QUESTION RECOMMENDER FOR AI ASSISTANT

(71) Applicant: Microsoft Technology Licensing, LLC, Redmond, WA (US)

(72) Inventors: Laurent Boué, Petah Tikva (IL); Swarnim Narayan, Bangalore (IN); Ravi Prasad Kondapalli, Bangalore (IN); Vijay Srinivas Agneeswaran, Bangalore (IN); Naveen Panwar, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 19/057,701

(22) Filed: Feb. 19, 2025

(51) Int. Cl.
*G06F 16/9038* (2019.01)
*G06N 20/00* (2019.01)
(52) U.S. Cl.
CPC ......... *G06F 16/9038* (2019.01); *G06N 20/00* (2019.01)
(58) Field of Classification Search
None
See application file for complete search history.

(56) References Cited

U.S. PATENT DOCUMENTS 11,875,121 B2 * 1/2024 Frost ...................... G06N 5/041
12,211,511 B1 * 1/2025 Sandrew ................. G10L 17/14
2023/0133392 A1 * 5/2023 Wang .................... G06F 40/211
704/9
2023/0153337 A1 * 5/2023 Jiang ........................ G06F 40/35
2024/0029026 A1 * 1/2024 Sharma .................. G06F 40/40
2024/0354498 A1 * 10/2024 Prasad ................... G06F 40/20
2025/0209064 A1 * 6/2025 Sharma .................. H04L 51/02

OTHER PUBLICATIONS

Ge, et al., "What should I Ask: A Knowledge-driven Approach for Follow-up Questions Generation in Conversational Surveys", arXiv:2205.10977v2, Oct. 13, 2023, 12 Pages.
(Continued)

*Primary Examiner* — Debbie M Le
(74) *Attorney, Agent, or Firm* — Holzer Patel Drennan

(57) ABSTRACT

One or more follow-up response recommendations relating to a question-answer event processed by an artificial intelligence assistant are generated. The one or more follow-up response recommendations identify questions from a predefined response library. A weighted average of embeddings is generated for each question-answer conversation of historical question-answer events collected via telemetry. A historical question-answer conversation includes a chronologically ordered sequence of question-answer events. A self-supervised weighted embedding dataset is generated and includes the weighted average of embeddings for each historical question-answer conversation and at least one corresponding semantic nearest neighbor question from the predefined response library. Topic weights of a follow-up question recommender are tuned by training the follow-up question recommender using the self-supervised weighted embedding dataset. The follow-up question recommender executes in an inference mode on the question-answer event to generate the one or more follow-up response recommendations of questions from the predefined response library.

20 Claims, 8 Drawing Sheets

(56)                    References Cited

OTHER PUBLICATIONS

Gupta, et al., "Learning to Automate Follow-up Question Generation using Process Knowledge for Depression Triage on Reddit Posts", arXiv:2205.13884v1, May 27, 2022, 11 Pages.

Kumar, et al., "ClarQ: A large-scale and diverse dataset for Clarification Question Generation", arXiv:2006.05986v2, Jun. 11, 2020, 06 Pages.

Meng, et al., "FOLLOWUPQG: Towards Information-Seeking Follow-up Question Generation", arXiv:2309.05007v2, Sep. 19, 2023, 20 Pages.

Tix, Bernadette J., "Follow-Up Questions Improve Documents Generated by Large Language Models", https://arxiv.org/pdf/2407.12017, 2024, 15 Pages.

* cited by examiner

400 ⌐

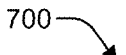

700

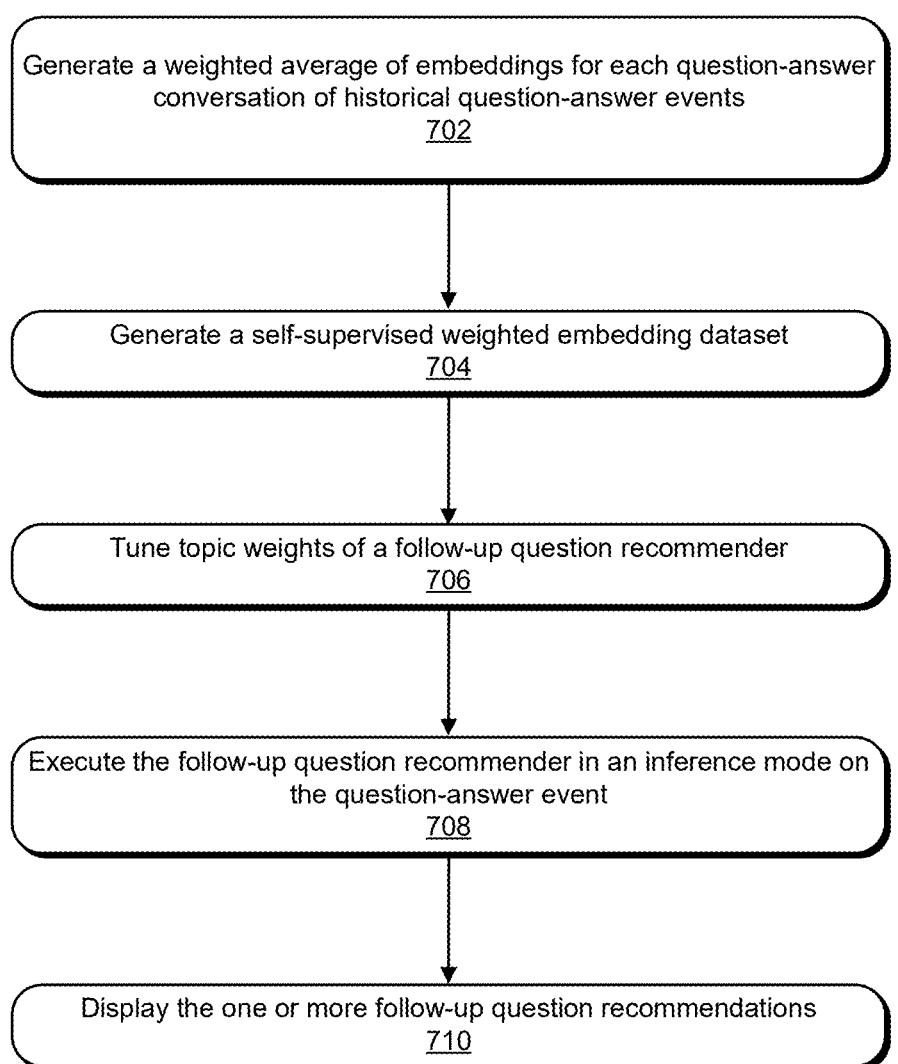

Generate a weighted average of embeddings for each question-answer
conversation of historical question-answer events
702

Generate a self-supervised weighted embedding dataset
704

Tune topic weights of a follow-up question recommender
706

Execute the follow-up question recommender in an inference mode on
the question-answer event
708

Display the one or more follow-up question recommendations
710

FIG. 7

FOLLOW-UP QUESTION RECOMMENDER FOR AI ASSISTANT

BACKGROUND

Modern artificial intelligence assistants (AI assistants) can provide a conversational session with a user, generally simulating human-to-human conversations. For example, if a user asks a question to an AI assistant (e.g., "What was the name of the first U.S. President?", the AI assistant may answer, "The name of the first U.S. President is George Washington" and then recommend three follow-up questions (e.g., "When was George Washington born?", "What were George Washington's major accomplishments?", and "Who succeeded George Washington as President") to guide the user on a deeper investigation following from the initial question. The more relevant and natural the follow-up questions provided by the AI assistant, the more engaged and satisfied the user will be, especially when the user is unsure about what question to ask next or about how to ask a better question to get a better result. However, developing an AI assistant that actually recommends relevant follow-up questions is challenging on many levels, including, without limitation, training, accuracy, and scaling with memory and storage consumption.

SUMMARY

In some aspects, the techniques described herein relate to a method of generating one or more response recommendations relating to a question-answer event processed by an artificial intelligence assistant, wherein the artificial intelligence assistant supports predefined artificial intelligence assistant topics and the one or more response recommendations identify questions from a predefined response library, the method including: generating a weighted average of embeddings for each question-answer conversation of historical question-answer events collected via telemetry, wherein a historical question-answer conversation includes a chronologically ordered sequence of question-answer events; generating a self-supervised weighted embedding dataset including the weighted average of embeddings for each historical question-answer conversation and at least one corresponding semantic nearest neighbor question from the predefined response library; tuning topic weights of a question recommender by training the question recommender using the self-supervised weighted embedding dataset; executing the question recommender in an inference mode on the question-answer event to generate the one or more response recommendations of questions from the predefined response library; and displaying the one or more response recommendations in a user interface.

In some aspects, the techniques described herein relate to a computing system for generating one or more response recommendations relating to a question-answer event processed by an artificial intelligence assistant, wherein the artificial intelligence assistant supports predefined artificial intelligence assistant topics and the one or more response recommendations identify questions from a predefined response library, the computing system including: memory; one or more hardware processors; a weighted average generator storable in the memory, executable by the one or more hardware processors, and configured to generate a weighted average of embeddings for each question-answer conversation of historical question-answer events collected via telemetry, wherein a historical question-answer conversation includes a chronologically ordered sequence of question-answer events and to generate a self-supervised weighted embedding dataset including the weighted average of embeddings for each historical question-answer conversation and at least one corresponding semantic nearest neighbor question from the predefined response library; and a recommendation model trainer storable in the memory, executable by the one or more hardware processors, and configured to tune topic weights of a question recommender by training the question recommender using the self-supervised weighted embedding dataset, wherein the artificial intelligence assistant executes the question recommender in an inference mode on the question-answer event to generate the one or more response recommendations of questions from the predefined response library, and to display the one or more response recommendations in a user interface.

In some aspects, the techniques described herein relate to one or more tangible processor-readable storage media embodied with instructions for executing on one or more processors and circuits of a computing device a process for generating one or more follow-up response recommendations relating to a question-answer event processed by an artificial intelligence assistant, wherein the artificial intelligence assistant supports predefined artificial intelligence assistant topics and the one or more follow-up response recommendations identify questions from a predefined response library, the process including: generating a weighted average of embeddings for each question-answer conversation of historical question-answer events collected via telemetry, wherein a historical question-answer conversation includes a chronologically ordered sequence of question-answer events; generating a self-supervised weighted embedding dataset including the weighted average of embeddings for each historical question-answer conversation and at least one corresponding semantic nearest neighbor question from the predefined response library; tuning topic weights of a follow-up question recommender by training the follow-up question recommender using the self-supervised weighted embedding dataset; executing the follow-up question recommender in an inference mode on the question-answer event to generate the one or more follow-up response recommendations of questions from the predefined response library; and displaying the one or more follow-up response recommendations in a user interface.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 7 illustrates example operations for generating question recommendations responsive to a question-answer event processed by an artificial intelligence assistant.

DETAILED DESCRIPTIONS

Figure 1:
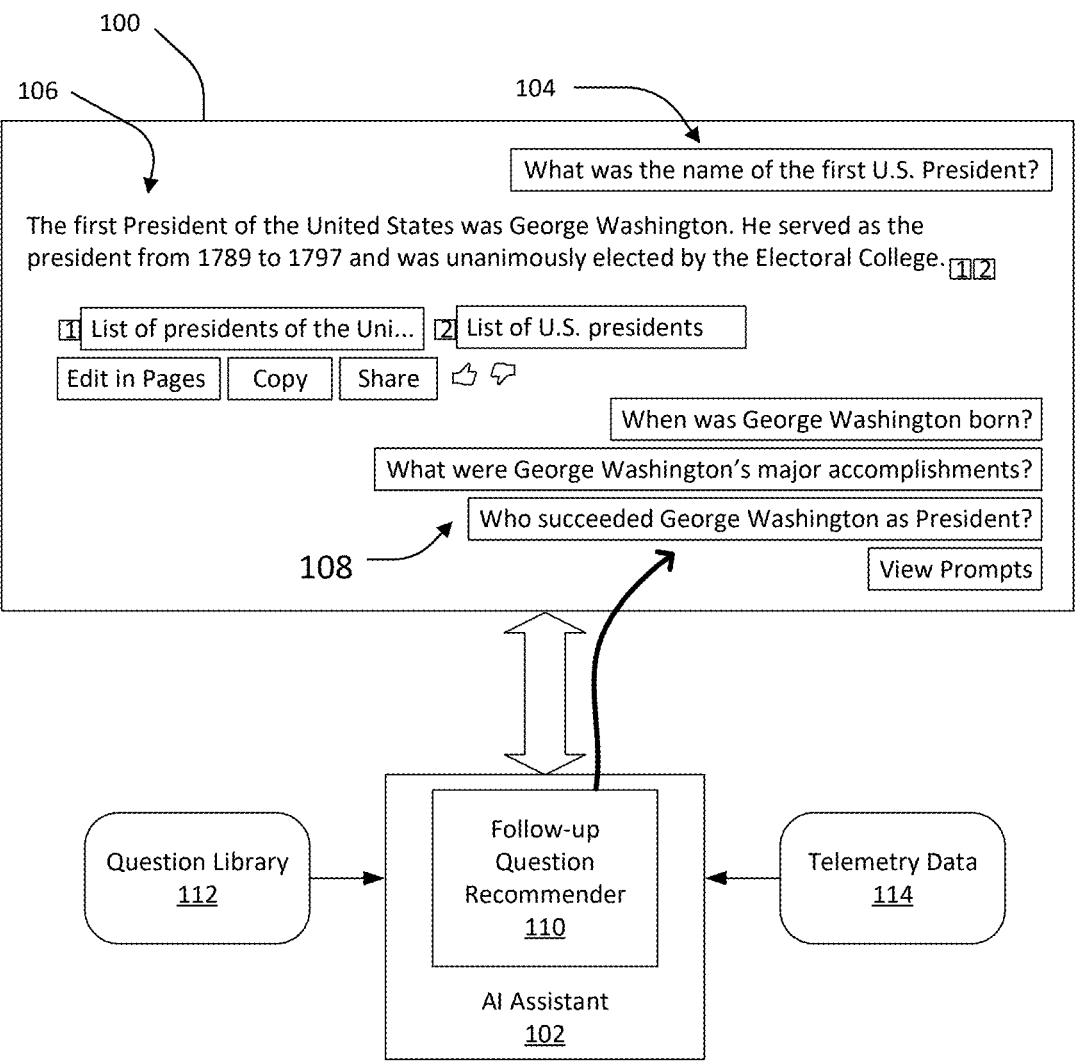
FIG. 1 illustrates an example user interface and an AI assistant with respect to a user question submitted through the user interface to the AI assistant, which generates an answer and follow-up question recommendations.

Providing good recommendations for follow-up questions to be presented in a user interface by an AI assistant (e.g., a chatbot) positively enhances user engagement and satisfaction. These recommendations help guide conversations between a user and the AI assistant, making interactions more natural and productive, especially when a user is unsure what to ask next. Correctly understanding the user's context and accurately predicting the user's intent in such user-assistant conversations present significant challenges. It is also challenging to present enough relevant guiding information without offering too many options that may overwhelm the user. One major technical difficulty in providing effective follow-up question recommendations in an AI assistant is aggregating the context of the conversation into a unified embedding that effectively manages the context of a conversation (e.g., rather than simply managing isolated question-answer events).

The described technology provides systems and methods for producing a tuned (e.g., optimal) set of weights that can be used to produce unified conversation embeddings and then generate relevant follow-up question recommendations for user-assistant conversations. The recommended follow-up questions are presented to a user via a user interface as guidance. The user can select one of the recommended follow-up questions or enter their own follow-up questions.

In this context, the described technology classifies user-assistant conversations according to lists of topics supported by the AI assistant and assigns a learnable weight to each topic. These topic weights are learned as parameters (somewhat analogous to hyperparameters) of a recommender model and are used to construct the weighted conversation embeddings (e.g., embeddings of a sequence of question-answer events). These weighted conversation embeddings are integrated into a recommender system based on a self-supervised labeled dataset derived from historical telemetry to train the recommender model for follow-up question recommendations. Accordingly, the described technology provides a technical benefit of improving the quality of follow-up question recommendations generated by an AI assistant to enhance the comfort and productivity of the user-assistant conversation. Additionally, as another technical benefit, the same optimal weights may also be used to improve the performance of semantic caches.

Further, the described technology does not simplify the task by using AI-based textual summarization of past QA events between this user and the AI assistant. This textual summarization approach would lose information that was present in the actual QA events and/or conversations, because, by definition, textual summarization does not preserve all of the original data. Instead, textual summarization generates an abstraction of the original text that includes salient points of the original data, thereby omitting some of the original data. Also, the current conversation may not have any historical relevance to past conversations between the user and the AI assistant—it may be a totally new topic without any historical context from past conversations.

Further still, the described technology provides improved scaling by selecting what is believed to be similar to a supported response (e.g., a question, a prompt, an answer) from a predefined response library (e.g., a predefined question, prompt, and/or answer library) rather than attempting to process embeddings of all historically collected questions from past conversations between the user and the AI assistant (or between other users and the AI assistant). The approach of processing embeddings of all historical collected questions, however, does not scale well, as it would quickly consume large numbers of QA events and/or conversations, especially if the data set includes QA events and/or conversations of multiple users, which can overwhelm system resources and slow performance. One solution to the resource constraints would be to take a mean of these historical embeddings, but this averaging approach would introduce substantial information loss from the original data, presenting a similar undesirable effect as textual summarization. As used herein, a prompt is a form of a question.

FIG. 1 illustrates an example user interface 100 and an AI assistant 102 with respect to a user question 104 submitted through the user interface 100 to the AI assistant 102, which generates an answer 106 and follow-up question recommendations 108. Generally, the user interface 100 shows a user question 104 that a user has input to the AI assistant 102. The AI assistant 102 includes one or more generative AI models that generate an answer 106 in response to the question. The AI assistant 102 also presents follow-up response recommendations (e.g., follow-up question recommendations 108) and presents them to the user through the user interface (e.g., as guidance to the user about the next possible stage of the conversation). In this implementation, the responses generated and presented by the AI assistant 102 are or include follow-up questions. In other implementations, the responses generated and presented by the AI assistant 102 are or include relevant answers retrieved from a semantic cache. Other implementations may also be employed.

In FIG. 1, the AI assistant 102 includes a follow-up question recommender 110 that uses the one or more generative AI models to generate the follow-up question recommendations 108 to guide the user to follow-on information relating to the user question 104 and the answer 106. A follow-up question is a question that is based at least in part on one or more previous questions in a question-answer conversation (a sequence of question-and-answer pairings referred to as a "QA conversation") between the user and the AI assistant 102. The follow-up question recommender 110 receives input from a question library 112 and telemetry data 114. The question library 112 stores a plurality of available questions that have been generally judged to be good candidates for follow-up questions that users may ask and that are supported by the AI assistant 102. The question library 112 may be collected into a database system for storage. The telemetry data 114 includes telemetry from historical question-answer events ("QA events") from one or more users, wherein the user's interaction (e.g., the QA conversation) with the AI assistant 102 is represented as a sequence of QA events. In some implementations, a question-answer event or a QA event includes either a question or an answer, such that QA event $e_i$ denotes $e_i = q_i$ or $e_i = a_i$.

Accordingly, the described technology includes a tuned topic modeling classifier that classifies QA events in conversations based on topic, generates self-supervised QA event datasets based on telemetry data of QA conversations and a predefined question library, generates another self-supervised weighted embedding dataset that maps weighted QA event embeddings to questions in the question library, and then tunes a follow-up question recommender to select relevant follow-up questions from the question library. In one view, reliance on a predefined question library manages resources by mapping follow-up questions to a predefined question library rather than to all (or many) possible questions historically collected by the AI assistant, thereby managing resource allocation when scaled. Furthermore, consideration of QA conversation telemetry and topic-classified QA event embeddings to intentionally weight QA events based on topic allows the AI assistant to avoid the loss of information presented by textual summarization or QA event averaging. Further still, the described technology preserves the ordered context of a sequence of QA events in a QA conversation, thereby enhancing the predicted relevance of each follow-up question recommendation in a current QA conversation.

Implementations of the described technology may employ, as input, some data components that are available to the recommending system:

a question library—a system-accessible library that includes predefined questions that have been judged to be good candidates for follow-up questions that users may ask.

a telemetry dataset of QA events previously/historically processed by the AI assistant 102. In one implementation, for example, interactions between users and the AI assistant 102 are represented as a sequence of questions and answers. Each question or answer is termed a "QA event." Denoting by $q_i$ and $a_i$ as the $i^{th}$ question and $i^{th}$ answer, respectively, a "QA conversation" consists of a sequence $[(q_1, a_1), (q_2, a_2), \ldots (q_i, a_i), \ldots]$. Those QA conversations and QA events are monitored via a telemetry mechanism of the AI assistant 102 and may be collected into a database system for storage.

Figure 2:
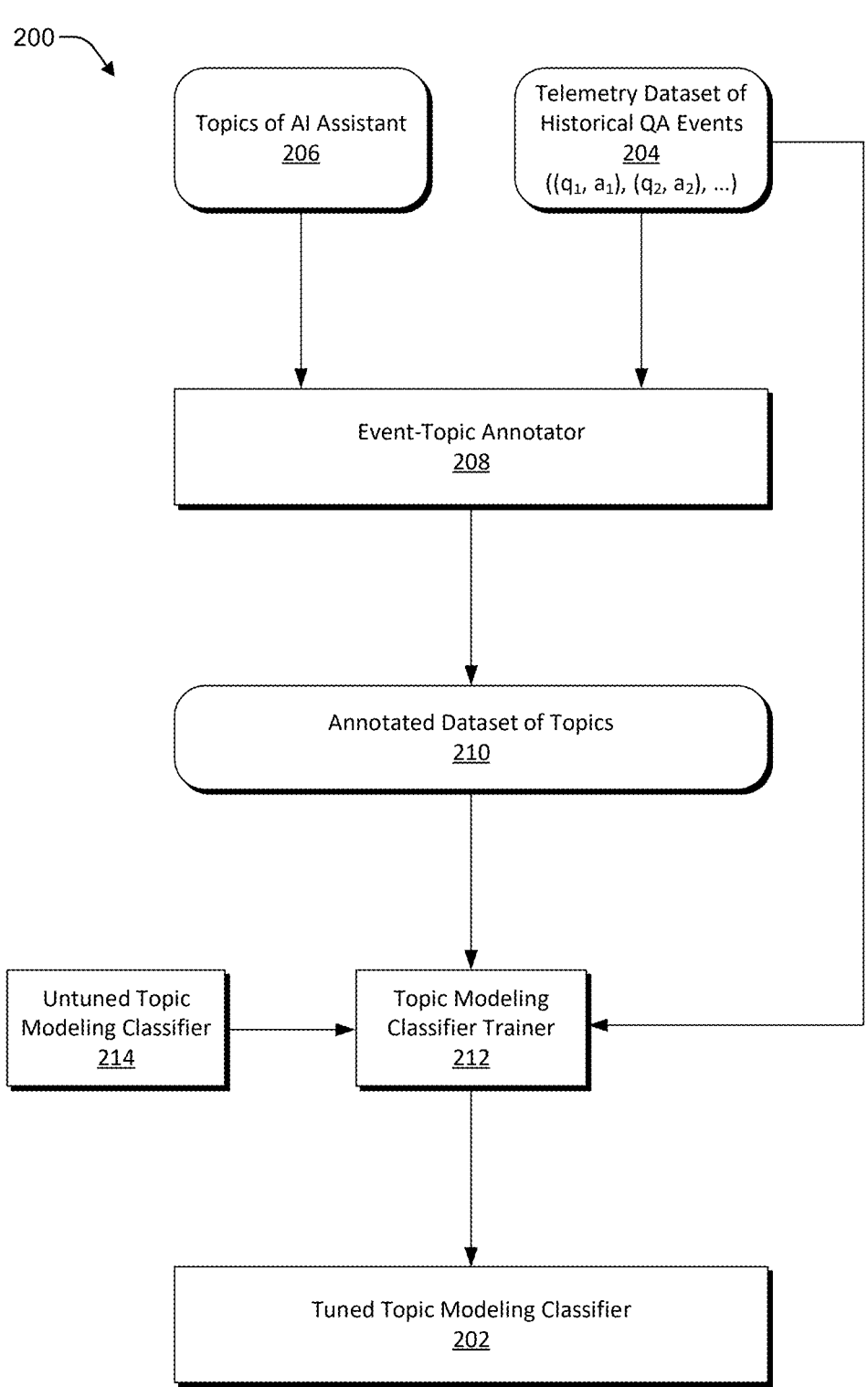
FIG. 2 illustrates an example system for generating a tuned topic modeling classifier.

FIG. 2 illustrates an example system 200 for generating a tuned topic modeling classifier 202. In one implementation, a subset of the telemetry data (see, e.g., the telemetry dataset 204 of historical QA events) is selected, although a full set of the telemetry data may be employed in other implementations. Furthermore, a list of relevant topics (see, e.g., topics 206 of the AI assistant) supported by the AI assistant and to which QA events may correspond is also available as input. In one implementation, the curation of relevant AI topics and QA events may have already been performed during the development of the AI assistant itself. A reason for the inclusion of this selection operation during development is that AI assistants are generally built to solve specific problems, and the developers of the AI assistants capture the scope of what may be answered by their AI assistants into a dedicated list of topics.

The telemetry dataset 204 and topics 206 are input to an event-topic annotator 208, which is configured to annotate the subset of QA events so that each event is mapped to a specific QA topic used to process the corresponding QA event. This annotation, for example, produces an annotated dataset of topics 210 in which each topic can be mapped to a large number (e.g., 1000s) of historical QAA events.

In the context of AI assistants, "topics" can be seen as the AI assistant competencies: they represent a subject around which content is organized and generated. Each topic contains conversational nodes that define how a conversation dialog is executed. Topics, therefore, include discrete conversation paths that, when used together, allow users to have a conversation that feels natural and flows appropriately. For example, "summarizing text" could be a "skill" of the AI assistant 102, which is instrumented by "topics," such as a conversational dialog interface receiving a question to summarize provided text, to refine a summary based on user input, to regenerate a new summary in a different style, etc. This step can involve human experts and/or computerized experts with domain expertise in the AI assistant in question. Note that the human effort may be alleviated by invoking few-shot LLM classifiers to assist the experts in annotating the QA events. This means that human experts may annotate only a few examples of QA events per topic before the rest of the annotation process can be handed off to an LLM for further processing.

Some examples of QA topics may include:

Asking for examples: "Can you give an example of that?" or "How does that apply in practice?"

Seeking clarification: "What do you mean by [term/concept]?" or "Can you explain that further?"

Exploring implications: "How does that impact [related area]?" or "What are the consequences of that?"

Requesting more information: "Can you tell me more about that?" or "What else can you share on that topic?"

Challenging assumptions: "How do you know that's true?" or "What evidence supports that claim?"

Relating to a larger context: "How does that relate to [broader topic]?" or "What are the bigger implications of that?"

Asking for next steps: "What's the next step in that process?" or "How can I apply that in a practical way?"

Note that this list of topics is only meant as an example and that each AI assistant may be assigned their own specific list of topics as judged appropriate by the human experts. As discussed below, each topic $t_i$ in the list of QA topics is assigned with a weight $w(t_i)$ initialized to random values, and then a weight for each topic implicated in a QA conversation is tuned in a follow-up recommender using topic-weighted embedding to recommend relevant follow-up questions in a current QA conversation with a user.

A topic modeling classifier trainer 212 receives an untuned topic modeling classifier 214 (e.g., a pre-trained/off-the-shelf AI classifier such as BERTtopic), a list of QA events from the telemetry dataset 204, and the annotated dataset of topics 210 to generate a tuned topic modeling classifier 202. In one implementation, the classifier trainer 212 trains classifier 214 to learn how to assign new QA events to a relevant topic. This tuning produces the modeling classifier 202 that takes a QA event, denoted $e_i$, as an argument and returns a QA topic, denoted $T[e_i]$, drawn from the annotated dataset of topics 210.

Figure 3:
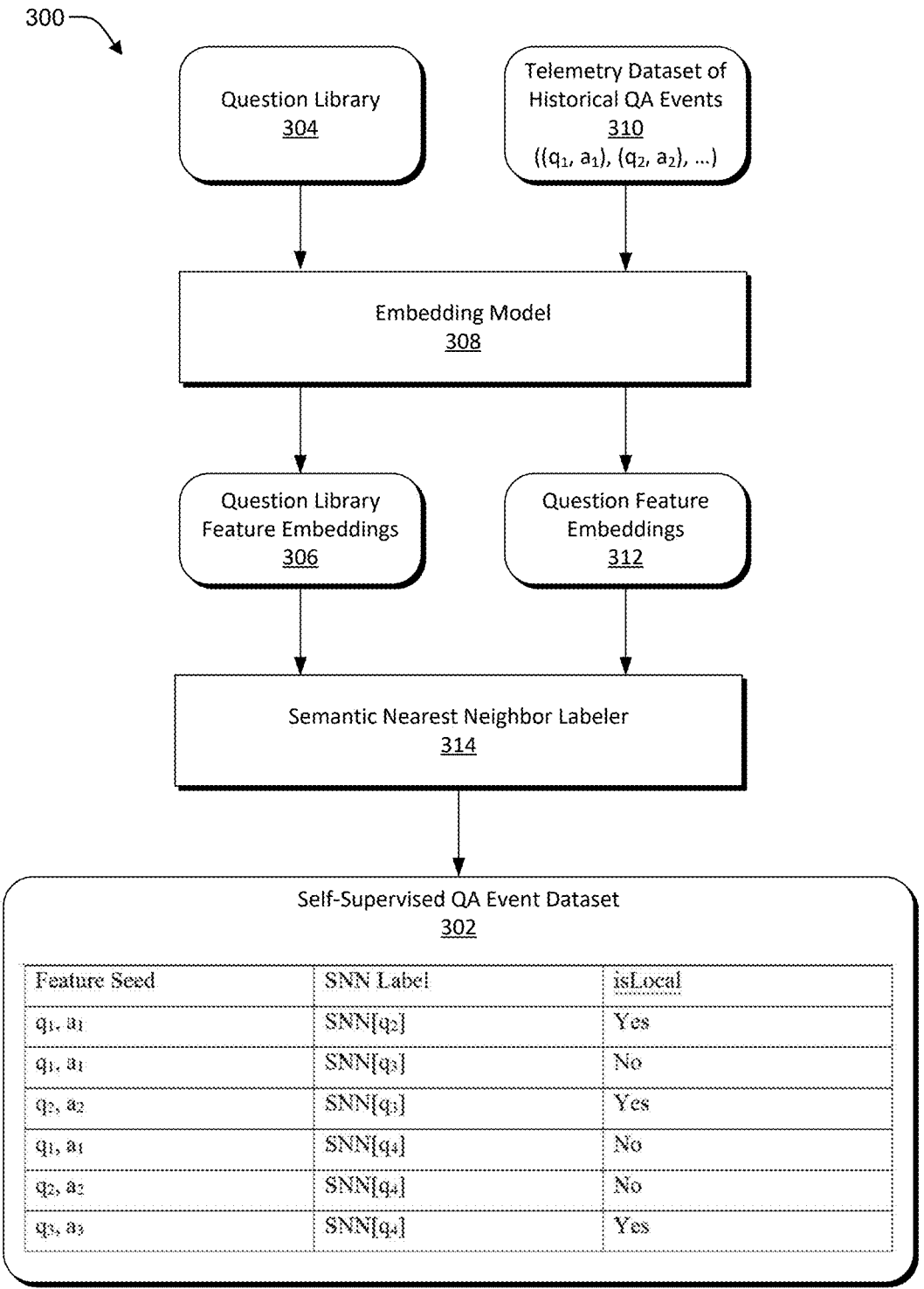
FIG. 3 illustrates an example system for generating a self-supervised QA event dataset.

FIG. 3 illustrates an example system 300 for generating a self-supervised QA event dataset 302. Questions, denoted as $p_1, p_2, p_3, \ldots$, in a pre-defined question library 304 are transformed into question library feature embeddings 306 (denoted as $L(p_1), L(p_2), L(p_3), \ldots$) using a language model L, which is identified in FIG. 3 as an embedding model 308. In artificial intelligence, an embedding model is a type of algorithm that learns to represent complex data (like text, images, or audio) as dense vectors of numbers. Example embedding models can, without limitation:

Transform data, taking raw data (like text, an image, or a piece of music) and converting it into a mathematical representation (a vector).

Capture relationships: These vectors are designed to capture the underlying meaning and relationships within the data. For example, words with similar meanings will have vectors that are close together in the vector space.

Example embedding models may include without limitation:

Word2Vec: A popular algorithm for generating word embeddings.

BERT: A powerful language model that also produces high-quality word embeddings.

CLIP: A model that learns visual concepts from natural language supervision.

In essence, embedding models act as a bridge between raw data and the machine learning algorithms that process it. Embedding models allow machines to understand and work with data in a way that is more human-like, enabling a wide range of powerful AI applications. In the described technology, for example, one or more embedding models generate embeddings of QA events and topics associated with questions in a question library to enable the system to recommend relevant follow-up questions.

A telemetry dataset 310 of historical QA events has been collected from the AI assistant or associated systems. For example, a user's session with an AI assistant consists of a series of four questions/answers denoted $(q_1, a_1)$, $(q_2, a_2)$, $(q_3, a_3)$, $(q_4, a_4)$. These ordered question-answer pairings in a user session are denoted as a QA conversation of QA events $(e_1, e_2, e_3, e_4)$. The questions $(q_1, q_2, q_3, q_4)$ are input to the embedding model 308 to produce question feature embeddings 312, denoted as $(L(q_1), L(q_2), L(q_3), \ldots)$.

The question library feature embeddings 306 and the question feature embeddings 312 are processed by a semantic nearest neighbor labeler (denoted as SNN labeler 314), which compares each question feature embedding with the question library feature embeddings 306 and ranks the question library feature embeddings 306 by similarity (cosine-similarity for example) with respect to each question feature embedding. In artificial intelligence, a semantic nearest neighbor (SNN) algorithm is a technique that finds the most similar items in a dataset based on their meaning or semantic relationship, rather than just their surface-level features. Semantic similarity refers to how closely related two pieces of information are in terms of their meaning, concepts, or underlying ideas. For example, "cat" and "feline" are semantically similar, while "cat" and "table" are not. Nearest neighbor algorithms are a class of algorithms that find the closest data points to a given query point in a dataset. An example SNN algorithm receives input data (e.g., questions/prompts, telemetry data) embeddings (vector embeddings). Each data element has been transformed into a high-dimensional vector by an embedding model. These vectors capture the semantic meaning of the data. The SNN labeler 314 calculates a semantic distance between a question library embedding and a question embedding, capturing how closely related the meanings of the predefined questions and historical questions are and ranking them with other question pairs. The algorithm also identifies the question embeddings with the smallest semantic distance to the question embedding. These pairings identify the "semantic nearest neighbors," with the questions representing the semantic nearest neighbor to a question as $SNN[q_i]$. For example, the most similar predefined question embeddings to the questions $q_1, q_2, q_3, q_4$ are returned by the SNN labeler 314 as $SNN[q_2]$, $SNN[q_3]$, $SNN[q_4]$, respectively.

Each question/answer tuple $(q_i, a)$ in the user's QA conversation (recorded in telemetry dataset 310) is paired with its corresponding logical neighbor $SNN[q_i]$ from the question library 304 and recorded in the self-supervised QA event dataset 302. The logic of the self-supervised dataset is described as follows:

In a typical QA conversation, after a question $q_i$ has been answered with an answer $a_i$, the user asks another question $q_{\{i+1\}}$. Obviously, $q_{\{i+1\}}$ is the best follow-up question to $q_i$ since it is in fact what the user asked themselves as a follow-up question. Unfortunately, this specific question $q_{\{i+1\}}$ from the user is most likely not present in the question library 304. Instead, the SNN labeler 314 has identified (in the previous step) which available predefined questions in the question library 304 had the closest semantic matching vector $SNN[q_{\{i+1\}}]$ to $q_{\{i+1\}}$. Therefore, given a question $q_i$, the most relevant next question that is available from the question library 304 is $SNN[q_{\{i+1\}}]$. The higher the similarity between $SNN[q_{\{i+1\}}]$ and $q_{\{i+1\}}$ means that the corresponding predefined question is asking a question more/most similar to $q_{\{i+1\}}$ compared to other questions in the question library 304.

Carrying out this procedure, for all questions with $i>1$, produces a table with the following schema:

feature seed, label, isLocal

The isLocal column indicates whether the connection between a question/answer pairing (feature seed)$(q_i, a_i)$ is connected to $SNN[q_i]$ as an immediate follow-up question if $j=i+1$, wherein isLocal=Yes a question more separated in time if $j>i+1$, wherein isLocal=No The isLocal flag can be used to filter training data. For example, if the system is configured to train the follow-up question recommender for only the immediate next question, the entries having an isLocal flag equaling Yes can be used as the training data. In contrast, if the system is configured to train the follow-up question recommended for both the immediate next question and subsequent next questions, other selections of the training data can be used (e.g., all of the entries in the table).

An example data set self-supervised QA event dataset resulting from this procedure is shown below in Table 1. Building this self-supervised table can be generalized to any number of question/answer pairs in the session's history. Only four pairings are shown below as an example. The self-supervised QA event dataset 302 is used to generate a self-supervised weighted embeddings dataset, illustrated in and described with respect to FIG. 4, which is used to tune the weights of a follow-up question recommender.

TABLE 1

| Example Self-supervised QA Event Dataset | | |
| --- | --- | --- |
| Feature Seed | SNN Label | isLocal |
| $q_1, a_1$ | $SNN[q_2]$ | Yes |
| $q_1, a_1$ | $SNN[q_3]$ | No |
| $q_2, a_2$ | $SNN[q_3]$ | Yes |
| $q_1, a_1$ | $SNN[q_4]$ | No |
| $q_2, a_2$ | $SNN[q_4]$ | No |
| $q_3, a_3$ | $SNN[q_4]$ | Yes |

Figure 4:
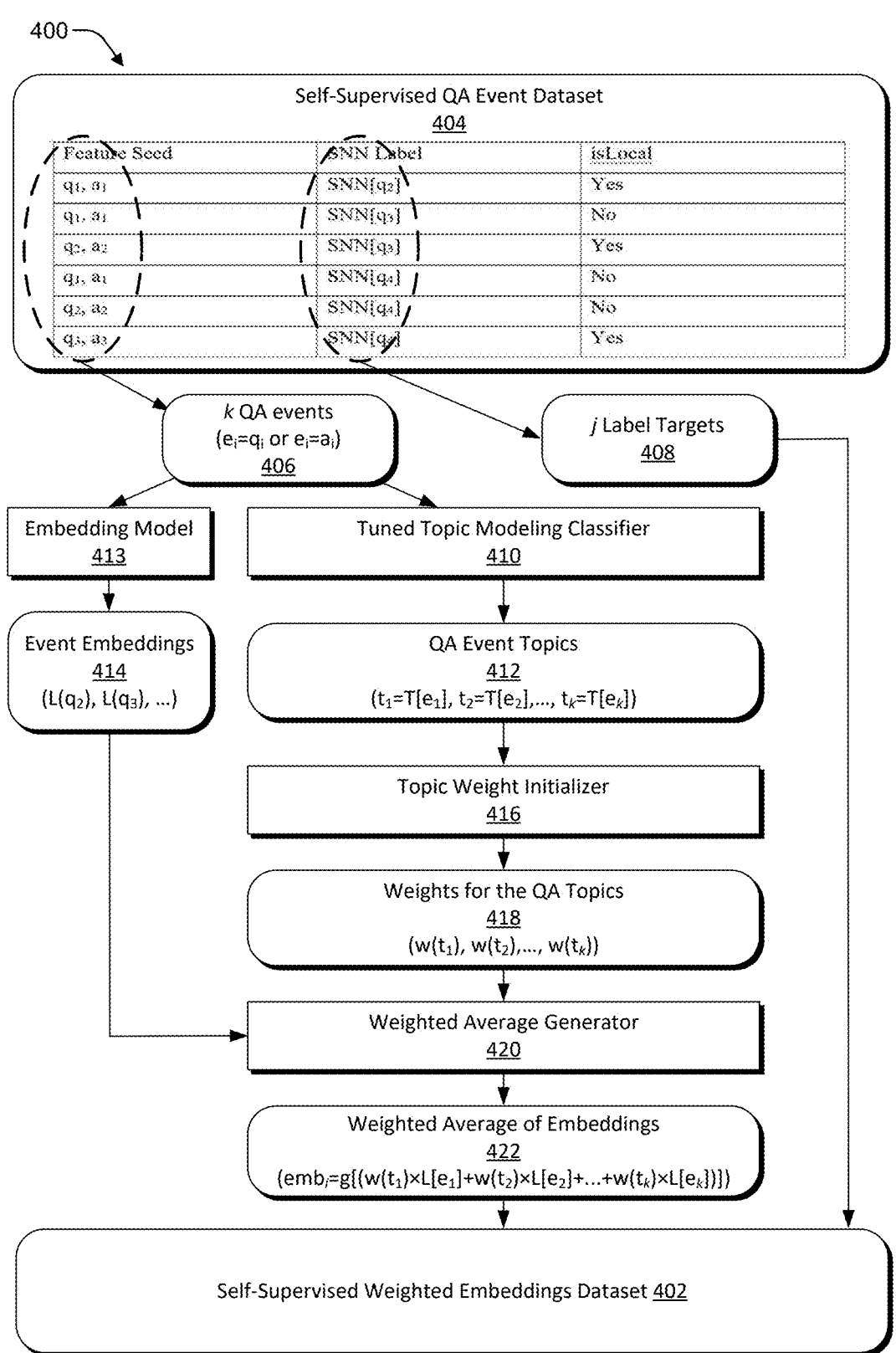
FIG. 4 illustrates an example system for generating a self-supervised weighted embeddings dataset.

FIG. 4 illustrates an example system 400 for generating a self-supervised weighted embeddings dataset 402. Generating the annotated dataset of topics 210 by the event-topic annotator 208 in FIG. 2 involved a pre-requisite step of setting a random weight to each topic, such that each topic $t_i$ is:

assigned with a weight $w(t_i)$; and each weight is initialized to a random value.

With reference to the self-supervised QA event dataset 302 mentioned with respect to FIG. 3 (see self-supervised QA event dataset 404 in FIG. 4), a user's interaction with an AI assistant can be represented as a list of QA events ($q_i$, $a_i$). If k QA events, denoted as ($e_1$, $e_2$, . . . , ex), are ordered chronologically, regardless of whether they are questions or answers (or, in fact, any other user-assistant textual interaction recorded in telemetry), where $e_i=(q_i)$ or $e_i=(a_i)$. those k events are referred to as the "conversation." Note that the choice for the value of k may change from session to session and depends on the user of the system and may, in fact, be unbounded, in which case the whole session's history will be used as a basis to build the features.

The selection of the size k of the conversation determines the possible target labels one can assign to the conversation. For example, using a self-supervised QA event dataset 404, such as the one generated with respect to FIG. 3, if k>6 is chosen, then the only possible target is SNN[$q_4$]. On the other hand, if k=4 is chosen, then both SNN[$q_3$] and where g is an adjustable function that will be tuned (similar to a hyperparameter) during training of the follow-up question recommender. Note that i refers to the index of the conversation defined by the k chosen QA events. Other features ($ft1_i$, $ft2_i$, . . . ) may be associated with the conversation i composed of the k QA events ($e_1$, $e_2$, . . . , $e_k$). Those features may include any other additional information, such as session duration, number of QA events, presence and value feedback information such as thumbs up/down, the user's metadata, and any other relevant features.

Each conversation i is assigned a target label SNN[$q_j$] according to the corresponding entries in the self-supervised QA event dataset 404. The logic presented above eventually produces the self-supervised weighted embeddings dataset 402, summarized in Table 2 below, where K denotes the defined length of a conversation, $C_{n,i}$ denotes the $n^{th}$ conversation and the $i^{th}$ event of that conversation.

TABLE 2

| | Example Self-supervised Weighted Embeddings Dataset | | | | |
|---|---|---|---|---|---|
| K | Conversation Index $C_{n,i}$ | Feature Seed | SNN Label | isLocal | Embeddings |
| 2 | $C_{1,1}$ | $q_1$, $a_1$ | SNN[$q_2$] | Yes | Embeddings ($C_1$, 1) |
| 2 | $C_{1,2}$ | $q_1$, $a_1$ | SNN[$q_3$] | No | Embeddings ($C_1$, 2) |
| 2 | $C_{1,3}$ | $q_1$, $a_1$ | SNN[$q_4$] | No | Embeddings ($C_1$, 3) |
| 4 | $C_{1,4}$ | $q_1$, $a_1$, $q_2$, $a_2$ | SNN[$q_3$] | Yes | Embeddings ($C_1$, 4) |
| 4 | $C_{1,5}$ | $q_1$, $a_1$, $q_2$, $a_2$ | SNN[$q_4$] | No | Embeddings ($C_1$, 5) |
| 6 | $C_{1,6}$ | $q_1$, $a_1$, $q_2$, $a_2$, $q_3$, $a_3$ | SNN[$q_4$] | Yes | Embeddings ($C_1$, 6) |
| 2 | $C_{2,1}$ | $q_1$, $a_1$ | SNN[$q_2$] | Yes | Embeddings ($C_2$, 1) |
| 2 | $C_{2,2}$ | $q_1$, $a_1$, | SNN[$q_3$] | No | Embeddings ($C_2$, 2) |
| 4 | $C_{2,3}$ | $q_1$, $a_1$, $q_2$, $a_2$ | SNN[$q_3$] | Yes | Embeddings ($C_2$, 3) |

SNN[$q_4$] are legitimate labels. Similarly, if k=2 is chosen, then all SNN[$q_2$], SNN[$q_3$], and SNN[$q_4$] may be used as labels.

The logic to build parametrized weighted average embedding features goes as follows. The selected value k defines the size of a conversation represented by an i-indexed list of k QA events 406 and label targets j (SNN[$q_j$])(see j label targets 408). The indices for individual conversations are denoted as n.

Each event of the k QA events 406 from the self-supervised QA event dataset 404 is input to a tuned topic modeling classifier 410 (e.g., produced as described with respect to FIG. 2), executing in inference mode. Therefore, the list of events ($e_1$, $e_2$, . . . , $e_k$) is associated with a list of QA event topics 412 ($t_1$=T[$e_1$], $t_2$=T[$e_2$], . . . , $t_k$=T[ex]). Furthermore, each QA event is also input to a language model L(see, e.g., the embedding model 308 in FIG. 3), executing in inference mode, to create a list of event embeddings 414 (L[$e_1$], L[$e_2$], . . . , L[$e_k$]). In FIG. 4, the language model L is illustrated as an embedding model 413.

The associated dataset of topic 210 from FIG. 2 is annotated with per-topic weights. FIG. 4 illustrates a topic weight initializer 416 that initializes the weights to a random value, and the weights 418 for the QA topics are denoted as ($w(t_1)$, $w(t_2)$, . . . , $w(t_k)$). In some alternative implementations, this initialization can take place within the FIG. 2 flow.

A weighted average generator 420 inputs the weights 418 for the QA topics in the list of QA event topics 412 and the list of event embeddings 414 and combines them into a weighted average of embeddings 422, such that:

$$emb(C_{n,i})=g[(w(t_1)\times L[e_1])+(w(t_2)\times L[e_2])+ \ldots +(w(t_k)\times L[e_k])]$$

Figure 5:
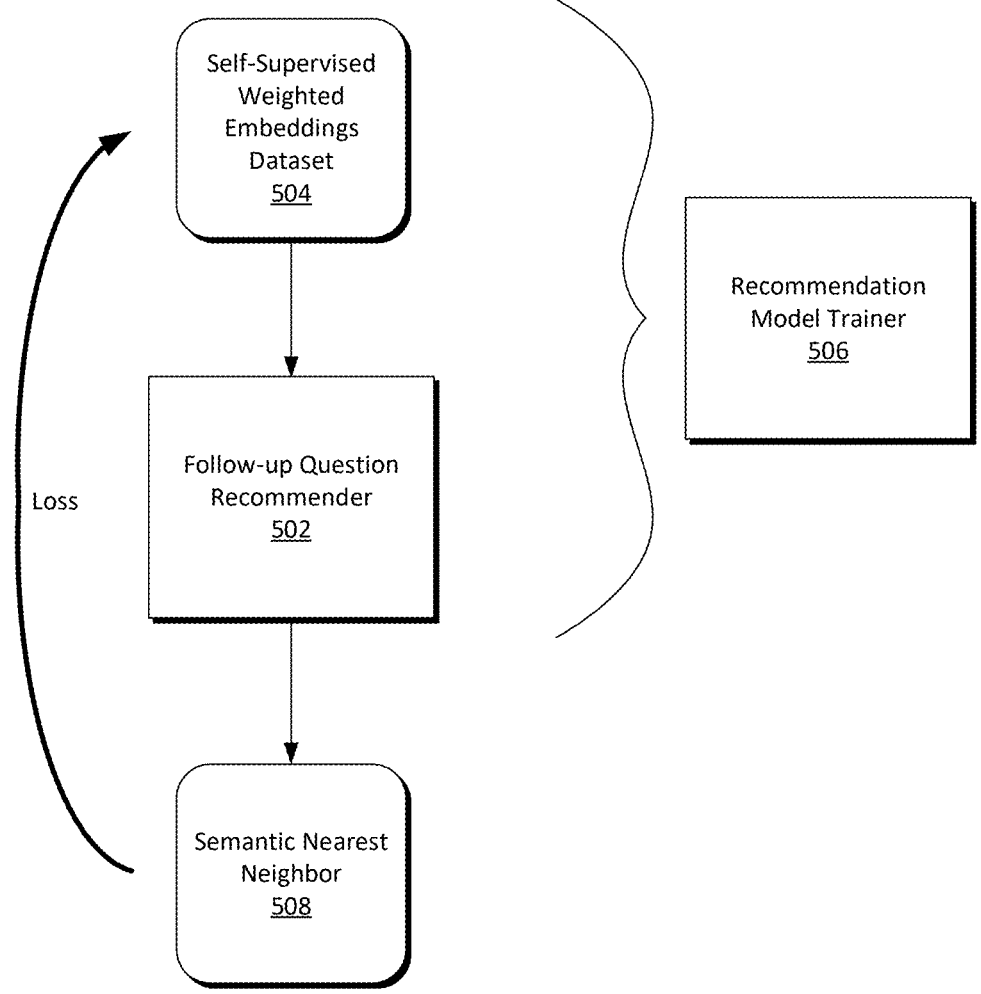
FIG. 5 illustrates an example system for generating a follow-up question recommender 502 with tuned weights and function (g) of the weighted average embeddings.

FIG. 5 illustrates an example system 500 for generating a follow-up question recommender 502 with tuned weights and function (g) of the weighted average embeddings. The flows shown and described with respect to FIGS. 2, 3, and 4 are typically performed in advance, in preparation for the flow shown and described with respect to FIG. 5. These flows in FIGS. 2, 3, and 4 may be periodically (or at other intervals) refreshed, e.g., to accommodate a new conversion. In contrast, the flow shown and described with respect to FIG. 5 is performed substantially in real-time after each answer in order to provide the follow-up question recommendations for each question and answer, for example.

At this stage, the system 500 can tune the function g (see the description of FIG. 4) and/or the set of weight parameters $W_{tuned}=[w(t_1)_{tuned}, w(t_2)_{tuned}, \ldots]$ for the QA topics by training the follow-up question recommender 502 on a self-supervised weighted embeddings dataset 504 (see, e.g., self-supervised weighted embeddings dataset 402 produced in the flow of FIG. 4). A recommendation model trainer 506 uses the function g and/or the QA weights $W=[w(t_1), w(t_2), \ldots]$ as parameters similar to "hyperparameters" of the learning process ("hyperparameters" is annotated in quotation marks as those weight parameters are different from traditional hyperparameters, which are properties of the classification model (such as number of trees in a tree-based model or number of layers in a deep learning model) that cannot be optimized by backpropagation (because the cross-entropy loss function used for classification is not continuous with those hyperparameters). Technically, hyperparameters do not modify the data itself but rather modify the properties of the classification algorithm. In contrast, the function g and the QA topic weights $W=[w(t_1), w(t_2), \ldots]$ explicitly modify the data that is input to the classification model, because different values of these variables lead to different values of the average embeddings that are used as the features of the classification model.

In this tuning stage, follow-up question predictions of the follow-up question recommender 502 are denoted by F(P, H, W), which is a function of:

P=set of internal learnable parameters that are optimized directly during the learning process over the self-supervised labeled dataset produced with respect to FIG. 4.

H=Parameters associated with the specific ML classifier model chosen by the user W=QA topic weights used to make weighted average embeddings. Note that even though these parameters are not traditional hyperparameters (since they modify the input data) as explained above, they may still be optimized using the same hyperparameter optimization techniques.

During training by the recommendation model trainer 506, the follow-up question recommender 502 takes input from the self-supervised weighted embeddings dataset 504 and outputs a candidate follow-up question in the form of an SNN 508, which is fed back within the training iterations via backpropagation. The optimization goal is formulated as:

Argmin_{P, H, W} CrossEntropy [F(P, H, W), SNN self-supervised labels]

where H and W are optimized via standard hyperparameter optimization techniques (such as Bayesian optimization) and P via backpropagation.

Solving this optimization problem produces the follow-up question recommender 502 that has been trained to include tuned (e.g., optimal) values for the weights of the weighted average embeddings $W_{tuned}$. Referring back to FIG. 1, therefore, the AI assistant 102 includes the follow-up question recommender 110 that has been produced using implementations of the described technique in one or more of its various stages.

The described technology can also be applied to a semantic cache. A semantic cache is a type of cache that stores and retrieves data based on its meaning or semantics, rather than just its exact keywords or syntax. A semantic cache may perform, without limitation, one or more of the following operations:

Analyze the meaning and context of the question.

Store data associated with concepts and relationships.

Retrieve relevant data even if the question is phrased differently or uses synonyms.

Generally, in operation, a semantic cache system can perform a semantic analysis of a question to understand its underlying meaning, identifying key concepts and their relationships. The system can transform the question into a numerical vector (embedding) that represents its semantic meaning. The system can also compare the query embedding to embeddings of previously cached data and, if a close semantic match is found, the associated data is retrieved from the cache. Accordingly, semantic caches are used to quickly retrieve answers by searching in the cache if a question/conversation having a similar meaning has already been encountered by the AI assistant in the past, and, if yes, return the answer that was provided back then. This approach avoids having to make an expensive (both in time as well as in financial resources) to a Large Language Model—LLM to provide the answer.

In accordance with the described technology, a set of optimal QA weights for weighted average embedding may also be useful in the context of semantic caches. Given a user's conversation with an AI assistant, represented as a list of QA events $(e_1, e_2, \ldots, e_k)$, the AI assistant can respond to the user's questions by returning relevant responses (e.g., answers) retrieved from a semantic cache.

Comparing the user's query with other queries/conversations stored in the semantic cache may be performed by comparing the similarity between their vector embeddings. In this case, the set of tuned (e.g., optimal) weights $W_{tuned}$ described above can be used to create an average embedding in the same or similar fashion. The weighted average embeddings using $W_{tuned}$ would be more accurate than those produced by off-the-shelf pre-trained language models since $W_{tuned}$ has been optimized directly for typical conversations between users and this specific AI assistant experience.

Figure 6:
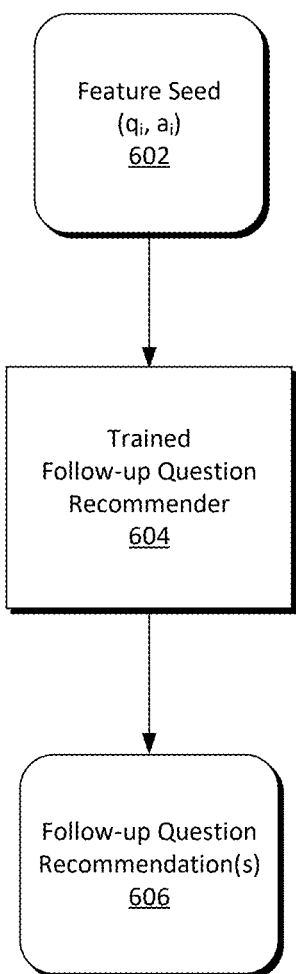
FIG. 6 illustrates an example system including a trained follow-up question recommender 602 receiving a feature seed as input and generating one or more follow-up question recommendations selected from a set of semantic nearest neighbors identified in a predefined question library.

FIG. 6 illustrates an example system 600 including a trained follow-up question recommender 602 receiving a feature seed 604 as input and generating one or more follow-up question recommendations 606 selected from a set of semantic nearest neighbors identified in a predefined question library. In operation, for example, the most recent question and answer in the feature seed 604 in the conversation between the user and the AI assistant is input to the trained follow-up question recommender 602. Based on the feature seed 604, the trained follow-up question recommender 602 then outputs the one or more follow-up question recommendations 606, which can be presented to the user via the user interface. The user can select one of the recommended questions to advance the conversation.

FIG. 7 illustrates example operations 700 for generating question recommendations responsive to a question-answer event processed by an artificial intelligence assistant. The artificial intelligence assistant supports predefined artificial intelligence assistant topics, and the one or more question recommendations identify questions from a predefined question library. In at least one implementation, the one or more question recommendations include follow-up questions, the predefined question library includes a predefined question library, and the question recommender includes a follow-up question recommender. In at least one other implementation, the one or more question recommendations include answers, the predefined question library includes a semantic cache of answers, and the question recommender processes the semantic cache to select an answer responsive to the question-answer event. FIG. 7 is described with regard to the follow-up question implementation but is descriptive of both types of implementations.

A generating operation 702 generates a weighted average of embeddings for each question-answer conversation of historical question-answer events collected via telemetry, wherein a historical question-answer conversation includes a chronologically ordered sequence of question-answer events. Another generating operation 704 generates a self-supervised weighted embedding dataset including the weighted average of embeddings for each historical question-answer conversation and at least one corresponding semantic nearest neighbor question from the predefined question library.

A tuning operation 706 tunes topic weights of a follow-up question recommender by training the follow-up recommender using the self-supervised weighted embedding dataset. A recommending operation 708 executes the follow-up recommender in an inference mode on the question-answer event to generate the one or more follow-up question recommendations of questions from the predefined question library. An output operation 710 displays the one or more follow-up question recommendations in a user interface.

In at least one implementation, generating the weighted average of embeddings includes weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation. In some implementations, the method may also generate a historical question embedding for each historical question-answer event of the historical question-answer conversation using an embedding model, classify each historical question-answer event of a historical question-answer conversation according to the predefined artificial intelligence assistant topics, and annotate each predefined artificial intelligence assistant topic corresponding to each historical question-answer event of the historical question-answer conversation with a weight to yield a topic weight for each historical question-answer event of the historical question-answer conversation.

Furthermore, in some implementations, the at least one corresponding semantic nearest neighbor question is selected by calculating a semantic distance between each predefined question embedding of the predefined question library and a question embedding from the historical question-answer conversation and selecting a predefined question embedding having a closest semantic distances from the question embedding. Tuning weights of the follow-up question recommender may include tuning the topic weights as parameters of the follow-up question recommender via backpropagation concurrently with tuning other parameters of the follow-up question recommender via hyperparameter optimization techniques.

Figure 8:
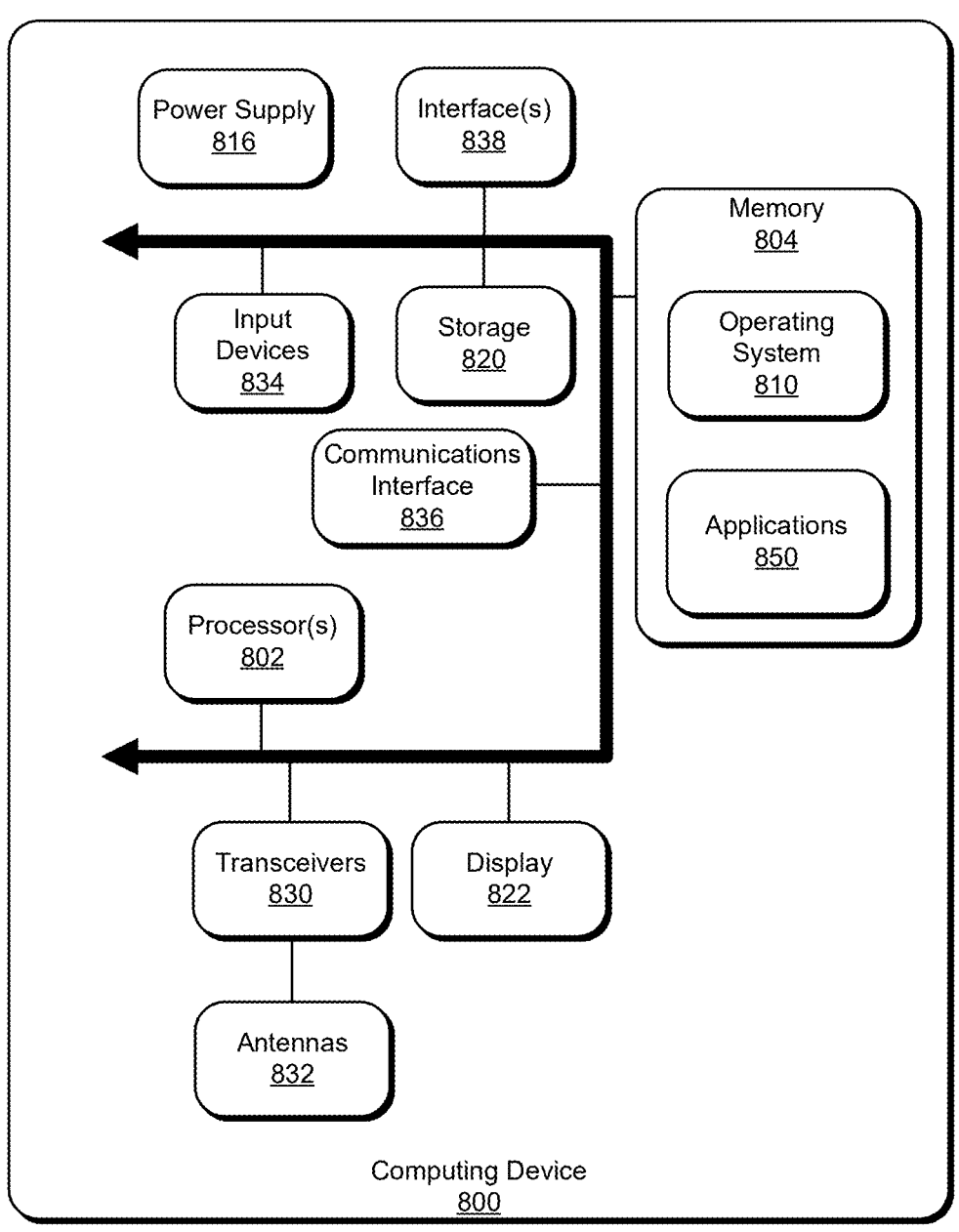
FIG. 8 illustrates an example computing device for use in implementing the described technology.

FIG. 8 illustrates an example computing device 800 for use in implementing the described technology. The computing device 800 may be a client computing device (such as a laptop computer, a desktop computer, or a tablet computer), a server/cloud computing device, an Internet-of-Things (IoT), any other type of computing device, or a combination of these options. The computing device 800 includes one or more hardware processor(s) 802 and a memory 804. The memory 804 generally includes both volatile memory (e.g., RAM) and nonvolatile memory (e.g., flash memory), although one or the other type of memory may be omitted. An operating system 810 resides in the memory 804 and is executed by the processor(s) 802. In some implementations, the computing device 800 includes and/or is communicatively coupled to storage 820.

In the example computing device 800, as shown in FIG. 8, one or more software modules, segments, and/or processors, such as applications 850, a follow-up question recommender, a question recommender, an answer recommender, a response recommender, an AI assistant, a user interface, an event-topic annotator, a topic modeling classifier trainer, a (tuned or untuned) topic modeling classifier, an embedding model, a semantic nearest neighbor labeler, a topic weight initializer, a weighted average generator, a recommendation model trainer, and other program code and modules are loaded into the operating system 810 on the memory 804 and/or the storage 820 and executed by the processor(s) 802. The storage 820 may store a predefined question library, a predefined question library, a predefined answer library, telemetry data, topics of an AI assistant, an annotated dataset of topics, question library feature embeddings, question feature embeddings, a self-supervised QA event dataset, QA events, label targets, event embeddings, QA event topics, weights, weighted average of embeddings, a self-supervised weighted embeddings dataset, and other data and be local to the computing device 800 or may be remote and communicatively connected to the computing device 800. In particular, in one implementation, components of a system for generating one or more question recommendations relating to a question-answer event processed by an artificial intelligence assistant may be implemented entirely in hardware or in a combination of hardware circuitry and software.

The computing device 800 includes a power supply 816, which may include or be connected to one or more batteries or other power sources, and which provides power to other components of the computing device 800. The power supply 816 may also be connected to an external power source that overrides or recharges the built-in batteries or other power sources.

The computing device 800 may include one or more communication transceivers 830, which may be connected to one or more antenna(s) 832 to provide network connectivity (e.g., mobile phone network, Wi-Fi®, Bluetooth®) to one or more other servers, client devices, IoT devices, and other computing and communications devices. The computing device 800 may further include a communications interface 836 (such as a network adapter or an I/O port, which are types of communication devices). The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). The computing device 800 may further include a display 822, such as a touchscreen display.

The computing device 800 may include a variety of tangible processor-readable storage media and intangible processor-readable communication signals. Tangible processor-readable storage can be embodied by any available media that can be accessed by the computing device 800 and can include both volatile and nonvolatile storage media and removable and non-removable storage media. Tangible processor-readable storage media excludes intangible and transitory communications signals (such as signals per se) and includes volatile and nonvolatile, removable and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of generating one or more response recommendations relating to a question-answer event processed by an artificial intelligence assistant, wherein the artificial intelligence assistant supports predefined artificial intelligence assistant topics and the one or more response recommendations identify questions from a predefined response library, the method comprising: generating a weighted average of embeddings for each question-answer conversation of historical question-answer events collected via telemetry, wherein a historical question-answer conversation includes a chronologically ordered sequence of question-answer events; generating a self-supervised weighted embedding dataset including the weighted average of embeddings for each historical question-answer conversation and at least one corresponding semantic nearest neighbor question from the predefined response library; tuning topic weights of a question recommender by training the question recommender using the self-supervised weighted embedding dataset; executing the question recommender in an inference mode on the question-answer event to generate the one or more response recommendations of questions from the predefined response library; and displaying the one or more response recommendations in a user interface.

Clause 2. The method of clause 1, wherein the one or more response recommendations include follow-up questions, the predefined response library includes a predefined response library, and the question recommender includes a follow-up question recommender.

Clause 3. The method of clause 2, wherein generating the weighted average of embeddings comprises: weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

Clause 4. The method of clause 3, further comprising: generating a historical question embedding for each historical question-answer event of the historical question-answer conversation using an embedding model; classifying each historical question-answer event of a historical question-answer conversation according to the predefined artificial intelligence assistant topics; and annotating each predefined artificial intelligence assistant topic corresponding to each historical question-answer event of the historical question-answer conversation with a weight to yield a topic weight for each historical question-answer event of the historical question-answer conversation.

Clause 5. The method of clause 4, wherein the at least one corresponding semantic nearest neighbor question is selected by calculating a semantic distance between each predefined question embedding of the predefined response library and a question embedding from the historical question-answer conversation and selecting a predefined question embedding having a closest semantic distances from the question embedding.

Clause 6. The method of clause 2, wherein tuning weights of the follow-up question recommender comprises: tuning the topic weights as parameters of the follow-up question recommender via backpropagation concurrently with tuning other parameters of the follow-up question recommender via hyperparameter optimization techniques.

Clause 7. The method of clause 1, wherein the one or more response recommendations include answers, the predefined response library includes a semantic cache of answers, and the question recommender processes the semantic cache to select an answer responsive to the question-answer event.

Clause 8. A computing system for generating one or more response recommendations relating to a question-answer event processed by an artificial intelligence assistant, wherein the artificial intelligence assistant supports predefined artificial intelligence assistant topics and the one or more response recommendations identify questions from a predefined response library, the computing system comprising: memory; one or more hardware processors; a weighted average generator storable in the memory, executable by the one or more hardware processors, and configured to generate a weighted average of embeddings for each question-answer conversation of historical question-answer events collected via telemetry, wherein a historical question-answer conversation includes a chronologically ordered sequence of question-answer events and to generate a self-supervised weighted embedding dataset including the weighted average of embeddings for each historical question-answer conversation and at least one corresponding semantic nearest neighbor question from the predefined response library; and a recommendation model trainer storable in the memory, executable by the one or more hardware processors, and configured to tune topic weights of a question recommender by training the question recommender using the self-supervised weighted embedding dataset, wherein the artificial intelligence assistant executes the question recommender in an inference mode on the question-answer event to generate the one or more response recommendations of questions from the predefined response library, and to display the one or more response recommendations in a user interface.

Clause 9. The computing system of clause 8, wherein the one or more response recommendations include follow-up questions, the predefined response library includes a predefined response library, and the question recommender includes a follow-up question recommender.

Clause 10. The computing system of clause 9, wherein the weighted average generator is further configured to weight each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

Clause 11. The computing system of clause 10, further comprising: an embedding model storable in the memory, executable by the one or more hardware processors, and configured to generate a historical question embedding for each historical question-answer event of the historical question-answer conversation using an embedding model; and a tuned topic model classifier storable in the memory, executable by the one or more hardware processors, and configured to classify each historical question-answer event of a historical question-answer conversation according to the predefined artificial intelligence assistant topics, wherein each predefined artificial intelligence assistant topic corresponding to each historical question-answer event of the historical question-answer conversation is annotated with a weight to yield a topic weight for each historical question-answer event of the historical question-answer conversation.

Clause 12. The computing system of clause 11, wherein the at least one corresponding semantic nearest neighbor question is selected by calculating a semantic distance between each predefined question embedding of the predefined response library and a question embedding from the historical question-answer conversation and selecting a predefined question embedding having a closest semantic distances from the question embedding.

Clause 13. The computing system of clause 9, wherein the recommendation model trainer is further configured to tune weights of the follow-up question recommender by tuning the topic weights as parameters of the follow-up question recommender via backpropagation concurrently with tuning other parameters of the follow-up question recommender via hyperparameter optimization techniques.

Clause 14. The computing system of clause 8, wherein the one or more response recommendations include answers, the predefined response library includes a semantic cache of answers, and the question recommender processes the semantic cache to select an answer responsive to the question-answer event.

Clause 15. One or more tangible processor-readable storage media embodied with instructions for executing on one or more processors and circuits of a computing device a process for generating one or more follow-up response recommendations relating to a question-answer event processed by an artificial intelligence assistant, wherein the artificial intelligence assistant supports predefined artificial intelligence assistant topics and the one or more follow-up response recommendations identify questions from a predefined response library, the process comprising: generating a weighted average of embeddings for each question-answer conversation of historical question-answer events collected via telemetry, wherein a historical question-answer conversation includes a chronologically ordered sequence of question-answer events; generating a self-supervised weighted embedding dataset including the weighted average of embeddings for each historical question-answer conversation and at least one corresponding semantic nearest neighbor question from the predefined response library; tuning topic weights of a follow-up question recommender by training the follow-up question recommender using the self-supervised weighted embedding dataset; executing the follow-up question recommender in an inference mode on the question-answer event to generate the one or more follow-up response recommendations of questions from the predefined response library; and displaying the one or more follow-up response recommendations in a user interface.

Clause 16. The one or more tangible processor-readable storage media of clause 15, wherein generating the weighted average of embeddings comprises: weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

Clause 17. The one or more tangible processor-readable storage media of clause 16, further comprising: generating a historical question embedding for each historical question-answer event of the historical question-answer conversation using an embedding model; classifying each historical question-answer event of a historical question-answer conversation according to the predefined artificial intelligence assistant topics; and annotating each predefined artificial intelligence assistant topic corresponding to each historical question-answer event of the historical question-answer conversation with a weight to yield a topic weight for each historical question-answer event of the historical question-answer conversation.

Clause 18. The one or more tangible processor-readable storage media of clause 17, wherein the at least one corresponding semantic nearest neighbor question is selected by calculating a semantic distance between each predefined question embedding of the predefined response library and a question embedding from the historical question-answer conversation and selecting a predefined question embedding having a closest semantic distances from the question embedding.

Clause 19. The one or more tangible processor-readable storage media of clause 15, wherein tuning weights of the follow-up question recommender comprises: tuning the topic weights as parameters of the follow-up question recommender via backpropagation concurrently with tuning other parameters of the follow-up question recommender via hyperparameter optimization techniques.

Clause 20: The one or more tangible processor-readable storage media of clause 15, wherein the one or more response recommendations include answers, the predefined response library includes a semantic cache of answers, and the question recommender processes the semantic cache to select an answer responsive to the question-answer event.

Clause 21. A system of generating one or more response recommendations relating to a question-answer event processed by an artificial intelligence assistant, wherein the artificial intelligence assistant supports predefined artificial intelligence assistant topics and the one or more response recommendations identify questions from a predefined response library, the system comprising: means for generating a weighted average of embeddings for each question-answer conversation of historical question-answer events collected via telemetry, wherein a historical question-answer conversation includes a chronologically ordered sequence of question-answer events; means for generating a self-supervised weighted embedding dataset including the weighted average of embeddings for each historical question-answer conversation and at least one corresponding semantic nearest neighbor question from the predefined response library; means for tuning topic weights of a question recommender by training the question recommender using the self-supervised weighted embedding dataset; means for executing the question recommender in an inference mode on the question-answer event to generate the one or more response recommendations of questions from the predefined response library; and means for displaying the one or more response recommendations in a user interface.

Clause 22. The system of clause 21, wherein the one or more response recommendations include follow-up questions, the predefined response library includes a predefined response library, and the question recommender includes a follow-up question recommender.

Clause 23. The system of clause 22, wherein the means for generating the weighted average of embeddings comprises: means for weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

Clause 24. The system of clause 23, further comprising: means for generating a historical question embedding for each historical question-answer event of the historical question-answer conversation using an embedding model; classifying each historical question-answer event of a historical question-answer conversation according to the predefined artificial intelligence assistant topics; and means for annotating each predefined artificial intelligence assistant topic corresponding to each historical question-answer event of the historical question-answer conversation with a weight to yield a topic weight for each historical question-answer event of the historical question-answer conversation.

Clause 25. The system of clause 24, wherein the at least one corresponding semantic nearest neighbor question is selected by calculating a semantic distance between each predefined question embedding of the predefined response library and a question embedding from the historical question-answer conversation and selecting a predefined question embedding having a closest semantic distances from the question embedding.

Clause 26. The system of clause 22, wherein the means for tuning weights of the follow-up question recommender comprises: means for tuning the topic weights as parameters of the follow-up question recommender via backpropagation concurrently with tuning other parameters of the follow-up question recommender via hyperparameter optimization techniques.

Clause 27. The system of clause 1, wherein the one or more response recommendations include answers, the predefined response library includes a semantic cache of answers, and the question recommender processes the semantic cache to select an answer responsive to the question-answer event.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of generating one or more response recommendations relating to a question-answer event processed by an artificial intelligence assistant, wherein the artificial intelligence assistant supports predefined artificial intelligence assistant topics and the one or more response recommendations identify responses from a predefined response library, the method comprising:

generating a weighted average of embeddings for each question-answer conversation of historical question-answer events collected via telemetry, wherein a historical question-answer conversation includes a chronologically ordered sequence of question-answer events;

generating a self-supervised weighted embedding dataset including the weighted average of embeddings for each historical question-answer conversation and at least one corresponding semantic nearest neighbor response from the predefined response library;

tuning topic weights of a response recommender by training the response recommender using the self-supervised weighted embedding dataset;

executing the response recommender in an inference mode on the question-answer event to generate the one or more response recommendations of responses from the predefined response library; and displaying the one or more response recommendations in a user interface.

2. The method of claim 1, wherein the responses include questions, the one or more response recommendations include one or more follow-up question recommendations, the at least one corresponding semantic nearest neighbor response includes at least one corresponding semantic nearest neighbor question, the predefined response library includes a predefined question library, and the response recommender includes a follow-up question recommender.

3. The method of claim 2, wherein generating the weighted average of embeddings comprises:

weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

4. The method of claim 3, further comprising:

generating a historical question embedding for each historical question-answer event of the historical question-answer conversation using an embedding model;

classifying each historical question-answer event of a historical question-answer conversation according to the predefined artificial intelligence assistant topics; and annotating each predefined artificial intelligence assistant topic corresponding to each historical question-answer event of the historical question-answer conversation with a weight to yield a topic weight for each historical question-answer event of the historical question-answer conversation.

5. The method of claim 4, wherein the at least one corresponding semantic nearest neighbor question is selected by calculating a semantic distance between each predefined question embedding of the predefined response library and a question embedding from the historical question-answer conversation and selecting a predefined question embedding having a closest semantic distance from the question embedding.

6. The method of claim 2, wherein tuning weights of the follow-up question recommender comprises:

tuning the topic weights as parameters of the follow-up question recommender via backpropagation concurrently with tuning other parameters of the follow-up question recommender via hyperparameter optimization techniques.

7. The method of claim 1, wherein the one or more response recommendations include answers, the predefined response library includes a semantic cache of answers, and the response recommender processes the semantic cache to select an answer responsive to the question-answer event.

8. A computing system for generating one or more response recommendations relating to a question-answer event processed by an artificial intelligence assistant, wherein the artificial intelligence assistant supports predefined artificial intelligence assistant topics and the one or more response recommendations identify questions from a predefined response library, the computing system comprising:

memory;

one or more hardware processors;

a weighted average generator storable in the memory, executable by the one or more hardware processors, and configured to generate a weighted average of embeddings for each question-answer conversation of historical question-answer events collected via telemetry, wherein a historical question-answer conversation includes a chronologically ordered sequence of question-answer events and to generate a self-supervised weighted embedding dataset including the weighted average of embeddings for each historical question-answer conversation and at least one corresponding semantic nearest neighbor question from the predefined response library; and a recommendation model trainer storable in the memory, executable by the one or more hardware processors, and configured to tune topic weights of a response recommender by training the response recommender using the self-supervised weighted embedding dataset, wherein the artificial intelligence assistant executes the response recommender in an inference mode on the question-answer event to generate the one or more response recommendations of questions from the predefined response library, and to display the one or more response recommendations in a user interface.

9. The computing system of claim 8, wherein the one or more response recommendations include follow-up questions, the predefined response library includes a predefined question library, and the response recommender includes a follow-up question recommender.

10. The computing system of claim 9, wherein the weighted average generator is further configured to weight each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

11. The computing system of claim 10, further comprising:

an embedding model storable in the memory, executable by the one or more hardware processors, and configured to generate a historical question embedding for each historical question-answer event of the historical question-answer conversation using an embedding model; and a tuned topic model classifier storable in the memory, executable by the one or more hardware processors, and configured to classify each historical question-answer event of a historical question-answer conversation according to the predefined artificial intelligence assistant topics, wherein each predefined artificial intelligence assistant topic corresponding to each historical question-answer event of the historical question-answer conversation is annotated with a weight to yield a topic weight for each historical question-answer event of the historical question-answer conversation.

12. The computing system of claim 11, wherein the at least one corresponding semantic nearest neighbor question is selected by calculating a semantic distance between each predefined question embedding of the predefined response library and a question embedding from the historical question-answer conversation and selecting a predefined question embedding having a closest semantic distances from the question embedding.

13. The computing system of claim 9, wherein the recommendation model trainer is further configured to tune weights of the follow-up question recommender by tuning the topic weights as parameters of the follow-up question recommender via backpropagation concurrently with tuning other parameters of the follow-up question recommender via hyperparameter optimization techniques.

14. The computing system of claim 8, wherein the one or more response recommendations include answers, the predefined response library includes a semantic cache of answers, and the response recommender processes the semantic cache to select an answer responsive to the question-answer event.

15. One or more tangible processor-readable storage media embodied with instructions for executing on one or more processors and circuits of a computing device a process for generating one or more response recommendations relating to a question-answer event processed by an artificial intelligence assistant, wherein the artificial intelligence assistant supports predefined artificial intelligence assistant topics and the one or more response recommendations identify responses from a predefined response library, the process comprising:

generating a weighted average of embeddings for each question-answer conversation of historical question-answer events collected via telemetry, wherein a historical question-answer conversation includes a chronologically ordered sequence of question-answer events;

generating a self-supervised weighted embedding dataset including the weighted average of embeddings for each historical question-answer conversation and at least one corresponding semantic nearest neighbor response from the predefined response library;

tuning topic weights of a response recommender by training the response recommender using the self-supervised weighted embedding dataset;

executing the response recommender in an inference mode on the question-answer event to generate the one or more response recommendations of responses from the predefined response library; and displaying the one or more response recommendations in a user interface.

16. The one or more tangible processor-readable storage media of claim 15, wherein generating the weighted average of embeddings comprises:

weighting each event embedding with a corresponding topic weight to yield a weighted event embedding for each historical question-answer event of the historical question-answer conversation, wherein the weighted average of embeddings includes a summation of weighted event embeddings corresponding to each historical question-answer event of the historical question-answer conversation.

17. The one or more tangible processor-readable storage media of claim 16, further comprising:

generating a historical question embedding for each historical question-answer event of the historical question-answer conversation using an embedding model;

classifying each historical question-answer event of a historical question-answer conversation according to the predefined artificial intelligence assistant topics; and annotating each predefined artificial intelligence assistant topic corresponding to each historical question-answer event of the historical question-answer conversation with a weight to yield a topic weight for each historical question-answer event of the historical question-answer conversation.

18. The one or more tangible processor-readable storage media of claim 17, wherein the responses include questions, the one or more response recommendations include one or more follow-up question recommendations, the at least one corresponding semantic nearest neighbor response includes at least one corresponding semantic nearest neighbor question, the predefined response library includes a predefined question library, the response recommender includes a follow-up question recommender, and the at least one corresponding semantic nearest neighbor question is selected by calculating a semantic distance between each predefined question embedding of the predefined response library and a question embedding from the historical question-answer conversation and selecting a predefined question embedding having a closest semantic distance from the question embedding.

19. The one or more tangible processor-readable storage media of claim 15, wherein tuning weights of the response recommender comprises:

tuning the topic weights as parameters of the response recommender via backpropagation concurrently with tuning other parameters of the response recommender via hyperparameter optimization techniques.

20. The one or more tangible processor-readable storage media of claim 15, wherein the one or more response recommendations include answers, the predefined response library includes a semantic cache of answers, and the response recommender processes the semantic cache to select an answer responsive to the question-answer event.

* * * * *